Dec. 22, 1970 G. M. GARDNER ET AL 3,550,150

MAGNETIC RECORDING TRANSDUCER

Filed June 14, 1967 2 Sheets-Sheet 1

Inventors
GERALD M. GARDNER
JORG WINTERMANTEL
By [signature]
Attorney

Dec. 22, 1970 G. M. GARDNER ET AL 3,550,150

MAGNETIC RECORDING TRANSDUCER

Filed June 14, 1967 2 Sheets-Sheet 2

Inventors
GERALD M. GARDNER
JORG WINTERMANTEL
By Merritt F. Lombard, Jr.
Attorney United States Patent Office 3,550,150
Patented Dec. 22, 1970

3,550,150
MAGNETIC RECORDING TRANSDUCER

Gerald Marvin Gardner, London, and Jorg Wintermantel, Stortford, England, assignors to International Standard Electric Corporation, New York, N.Y., a corporation of Delaware Filed June 14, 1967, Ser. No. 645,941
Claims priority, application Great Britain, July 1, 1966, 29,687/66
Int. Cl. G11b 5/20, 5/22, 5/42
U.S. Cl. 346—74 2 Claims

ABSTRACT OF THE DISCLOSURE

A recording head for a magnetic printing process is made by winding energising windings on thin soft iron wire cores. The windings and cores are embedded in an epoxy resin with one end of the core and winding flush with the recording surface. A magnetic flux return path between the recording surface and the other end of the cores can be provided by bending over the free ends of the cores or by inserting a separate piece of magnetic material close to the cores.

BACKGROUND OF THE INVENTION

This invention relates to magnetic recording devices and to a method of making such devices. The device has particular application in the field of electro-magnetic printing.

The process of electro-magnetic printing comprises forming a magnetic image in a magnetisable recording surface, applying a magnetic powder material to the surface so that the powder adheres to the magnetic pattern or image only and then transferring the powder image to a sheet of paper or other print surface where it is permanently fixed in the form of a physical image.

The formation of the magnetic image is most conveniently carried out by building the image up from a matrix of magnetic dots. A single row of closely spaced very small magnetic recording gaps can be moved in steps across the recording medium and selectively energised at each step to build up a character or pattern.

SUMMARY OF THE INVENTION

It is an object of the present invention to provide a magnetic recording device which may be used for recording magnetic patterns in the manner described above. It is another object of the invention to provide a method of making electro-magnetic recording devices which may be used for recording magnetic patterns in the manner described above.

According to the invention there is provided a magnetic recording device including a plurality of rod-like cores of magnetisable material, a plurality of energising windings each surrounding a respective core in one-to-one correspondence, a support block of non-magnetic material in which the cores are embedded, the support block having a recording surface adapted to be adjacent a recording medium, at least one end of each core being flush with the recording surface and separated from the end or ends of adjacent cores by substantially the thickness of the windings only, the end turns of one end of each core winding being substantially flush with the recording surface of the block of non-magnetic material.

The invention also provides a method of making a magnetic recording device, the method including the steps of winding an energising winding along a portion of a wire magnetic core member, locating one free end of the core member in an aperture in a locating member so that the end turns of one end of the winding are abutting the locating member, the aperture being separated from adjacent apertures for adjacent cores by substantially the thickness of the core windings only, embedding the core in a body of non-magnetic material and removing the locating member and the free end of the core therein so that the core ends and the end turns of the windings are substantially flush with the surface of the body so exposed, the ends of the windings being brought out to form electrical connections at a surface or surfaces of the body other than the surface at which the core ends are situated.

A feature of the invention is that to reduce the likelihood of unwanted magnetic coupling between adjacent cores the ends of the cores remote from the recording surface are moved apart before the cores and windings are embedded in the non-magnetic material.

According to another feature of the invention the ends of the cores remote from the recording surface are indirectly coupled via a return magnetic path through a piece of magnetic material to the ends of the cores at the recording surface.

BRIEF DESCRIPTION OF THE DRAWINGS

In order that the above and other features of the invention may be more readily understood embodiments thereof will now be described with reference to the accompanying drawings in which.

DESCRIPTION OF THE PREFERRED EMBODIMENTS

Figure 2A:
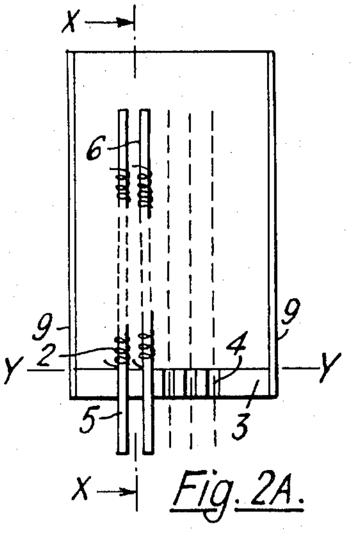
FIGS. 2*a* and 2*b* are two views of a completed head.
Figure 2B:
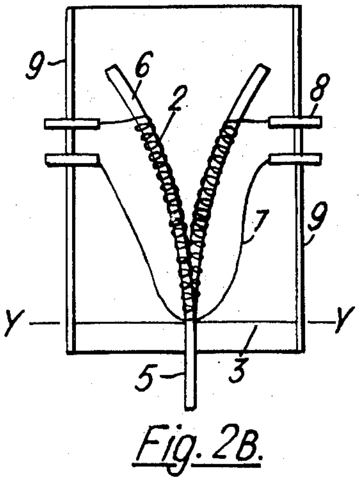

FIG. 2*b* is a diagrammatic sectional view of FIG. 2*a* on the line XX.

Figure 1:
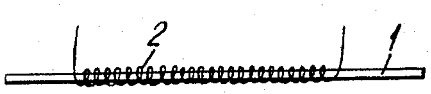
FIG. 1 illustrates the winding on a single core.

Each core comprises a piece of soft iron wire 1, FIG. 1, with a winding 2 of thin insulated wire along a portion of the core 1.

Figure 3:
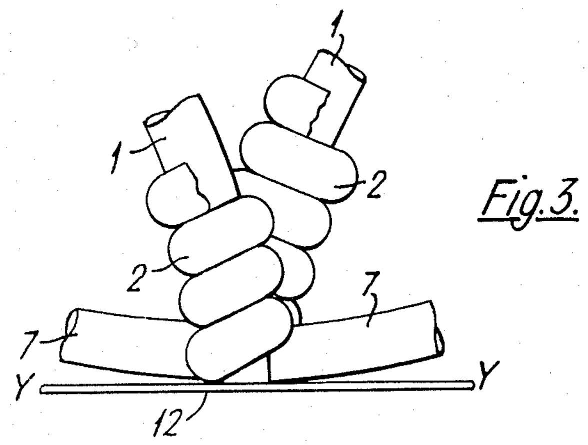
FIG. 3 is a detailed enlargement of part of FIG. 2*b*.

A brass plate 3 has a number of holes 4 drilled in it, each hole 4 being just big enough to receive the end 5 of one of the cores 1. Each core end 5 is pushed through the plate 3 until the end turns of the winding 2 abut the plate 3. The other ends 6 of the cores 1 are alternately pulled to one side or the other, and the free ends 7 of the windings 2 are soldered to pins 8 which are fixed in thin sheets of non-conducting material 9. The sheets 9 have previously been glued or otherwise fixed to the edges of the brass plate 3 to provide not only a support for the pins 8 but also to form a mould for the plotting compound which is used to fill up the space within to hold the cores and windings as required. Finally the plate 3 is ground or otherwise cut away to the line YY to leave the ends of the cores 5 flush with the surface of the solidified potting compound with the end turns of the windings 2 at or extremely close to the surface on the line YY. FIG. 3 shows in greater detail the ends of the windings as depicted in FIG. 2*b*. Two cores are shown, one behind the other as they would be seen in FIG. 2*b*. Each core 1 has its winding 2 coming down to the surface YY of the support block of potting compound. The ends 7 of the two windings are taken off in alternate directions. FIG. 3 shows how the upper ends of the adjacent cores are bent away from each other to avoid undesirable cross coupling between the cores.

It should be noted that the efficiency of the recording device described depends to a large extent on how close the ends of the windings are to the recording surface.

Provided the continuity of each winding is not broken the winding may even be exposed at the recording surface.

As an indication of the dimensions of such a recording device as described above, if each core wire 1 is 0.004" in diameter and the winding wire is 0.001" thick, then the two ends of adjacent cores can be spaced on approximately 0.006" pitch, centre-to-centre. Thus a row of individual recording magnetic cores can be spaced at intervals of 0.006" approximately.

Figure 4:
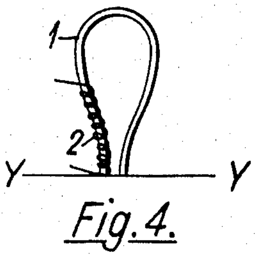
FIG. 4 illustrates one method of coupling the far end of the core with the core end at the recording surface.
Figure 5:
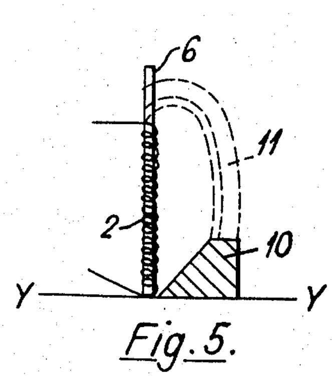
FIG. 5 illustrates an alternative method of coupling the core end.

In order to increase the magnetic flux field generated at the recording surface by each head it may be desirable to provide some form of flux return path between the two ends of each core. FIG. 4 illustrates how this may be achieved by extending the upper end 6 of each core 1 and bending it over and returning this free end 6 to the recording surface adjacent to the winding 2. Alternatively the support block may include a separate piece of magnetic material 10, FIG. 5, placed close to the recording end of each core and extending upward and away from the core to form at least part of the flux return path, the remainder of which is indicated by the dotted lines.

The cores require low coercivity, high saturation magnetisation and are not limited to soft iron. Other materials such as radiometal or mild steel are satisfactory, provided they are not too brittle to withstand the bending required for the construction shown in FIG. 4.

While the recording device so far has been referred to in terms of electro-magnetic printing only it will be appreciated that the head construction is also suitable for recording and/or replay heads for other electro-magnetic recording processes, such as tape recording and magnetic drum storage.

In the case of a head used for recording on tape, the removal of the brass plate 3, FIG. 2, can be performed in such a way that two raised side portions of the plate remain to act as tape guides.

Although for most applications potting of the cores in a plain epoxy resin compound is quite satisfactory it is possible to impregnate the compound with fillers such as amorphous silica to reduce wear of the recording surface. Alternatively air ducts may be drilled or otherwise provided to enable the head to be supported and located on an air bearing if the circumstances permit. It will be appreciated that the problem of wear is important since the ends of the windings are located virtually at the surface of the head. Yet another method of combating wear is to leave the end turns of the windings exposed and to cover the recording surface with a replaceable film of wear resistant material 12 which should not exceed 0.002" in thickness. Materials which may be used include wear resistant plastic films. Alternatively the recording surface may have a film of material such as silicon nitride deposited thereon by a glow discharge process. Other potting compounds may be used where the properties of the potting compounds may effect the performance of the head. For example, temperature considerations may call for the use of compounds other than epoxy resins.

What we claim is:

1. A magnetic recording device comprising:

(a) a block of non-magnetic material having a recording surface adjacent to a recording medium;

(b) a plurality of substantially straight wire cores of magnetizable material embedded in said block, each having one end extending out to said recording surface to be flush therewith, said one ends being substantially in parallel relationship to one another in a row and spaced apart by a predetermined separation distance, the ends of adjacent ones of said cores remote from said recording surface being positioned to lean away from each other so as to avoid cross-coupling therebetween; and (c) an energization winding on each of said cores, the winding having an end turn positioned at the end of the respective core and flush with said recording surface, the separation distance between adjacent parallel core ends being predetermined by substantially the thickness of the windings associated therewith.

2. A recording device according to claim 1 wherein the ends of the windings corresponding to the bent ends of said cores are brought out to form electrical connections at a surface of said block other than said recording surface and wherein a thin film of replaceable wear-resistant material covers said recording surface.

References Cited

UNITED STATES PATENTS

| | | | |
|---|---|---|---|
| 2,785,038 | 3/1957 | Ferber | 346—74 |
| 3,156,919 | 11/1964 | Rutter | 346—74 |
| 3,197,210 | 7/1965 | Atsumi | 179—100.2 |
| 3,243,519 | 3/1966 | Parstorfer | 340—174.1 |

OTHER REFERENCES

Groben, W. M., et al., "Wear Coating for a Tape Head," IBM Technical Disclosure Bulletin, vol. 9, No. 9, February 1967.

BERNARD KONICK, Primary Examiner

G. M. HOFFMAN, Assistant Examiner

U.S. Cl. X.R.

29—603; 179—100.2; 340—174.1